United States Patent Office 3,577,395
Patented May 4, 1971

3,577,395
NOVEL CATALYST FOR THE POLYMERIZATION OF CONJUGATED DIENES
Joginder Lal and Morford C. Throckmorton, Akron, Ohio, assignors to The Goodyear Tire & Rubber Company, Akron, Ohio
No Drawing. Filed Apr. 9, 1969, Ser. No. 814,831
Int. Cl. C08d 3/06
U.S. Cl. 260—82.1                     10 Claims

ABSTRACT OF THE DISCLOSURE

There is disclosed a process of the polymerization of butadiene and butadiene in mixture with other conjugated diolefins to form polymers containing a high portion of butadiene units in the cis 1,4 configuration comprising contacting at least one diolefin with a catalyst comprising (A) at least one compound selected from the group consisting of organometallic compounds wherein the metal is selected from Groups I, II and III of the Periodic Table and hydrides of metals of Groups II and III of the Periodic Table and their monomeric or polymeric halide derivatives, amine derivatives and complexes of these hydrides with amines, ethers or other molecules capable of forming complex compounds with these hydrides, (B) at least one organonickel compound and (C) at least one organic fluoro-chemical compound.

---

This invention is directed to methods of polymerizing butadiene and butadiene in mixture with other conjugated diolefins to form polymers having a high content of cis-1,4 addition. It is also directed to catalyst systems useful for this purpose.

Polymers of butadiene or butadiene in mixture with other conjugated diolefins containing a high portion of the butadiene units in the cis-1,4 configuration possess properties which make them useful as synthetic rubbers and for providing high impact resistance to plastics.

It is an object of this invention to provide a method whereby butadiene can be polymerized to a high content of cis-1,4 structure, that is, a cis-1,4 content greater than 85 percent. Another object is to provide a catalyst system by which these polymerizations may be accomplished. Another object is to form copolymers of isoprene or other conjugated diolefins and butadiene, in which the repeat units derived from butadiene have a high content of cis-1,4 structure. Other objects will become apparent as the description proceeds.

The catalytically promoted polymerization of diolefins is well known to the art. Many catalysts that have been proposed for the polymerization of 1,3-dienes are catalysts of either the Ziegler-Natta type or alkali metal catalysts such as butyllithium. Usually these prior art catalysts have yielded polydienes having mixed structures, that is, mixtures of cis-1,4, trans-1,4, 1,2- and 3,4-structure. However, several prior art catalyst systems have been shown to give predominantly the desirable cis-1,4 structure. One such system is a ternary catalyst system comprised of (1) an alkylaluminum halide, (2) a cerium metal chelate compound and (3) a trialkylaluminum or alkylaluminum hydride. Another prior art catalyst system, capable of producing polydienes having a high content of cis-1,4 structure, is also a ternary catalyst system comprised of (1) at least one organometallic compound wherein the metal is selected from a class consisting of metals of Groups I, II and III of the Periodic Table, (2) an organonickel salt and (3) at least one compound selected from a class consisting of boron trifluoride and complex compounds thereof.

The present invention also employs a ternary catalyst system somewhat similar to the last mentioned catalyst system described above but employs different and novel catalysts as the third catalyst component. This new ternary catalyst system utilizes certain types of organic fluorochemical compounds instead of the boron trifluoride and complex compounds thereof.

Thus, according to the present invention, butadiene or butadiene in combination with other conjugated diolefins is polymerized by contact, under solution polymerization conditions, with a catalyst comprising (A) at least one compound selected from a group of compounds consisting of (1) hydrides of metals of Groups II and III, (2) monomeric halide derivatives of hydrides of metals of Groups II and III, (3) polymeric halide derivatives of hydrides of metals of Groups II and III, (4) amine derivatives of hydrides of metals of Groups II and III, (5) complexes of hydrides of metals of Groups II and III with amines, ethers or other molecules capable of forming complexes with such hydrides and (6) organometallic compounds wherein the metal is selected from the metals of Groups I, II and III; (B) at least one organometallic compound selected from the group consisting of (1) nickel salts of carboxylic acids, (2) organic complex compounds of nickel, (3) nickel tetracarbonyl and (4) pi-bonded organonickel compounds and (C) at least one organic fluorochemical compound selected from a group consisting of fluorine containing (1) carboxylic acids, (2) acid anhydrides, (3) alcohols, (4) aldehydes, (5) esters, (6) epoxides, (7) ketones, (8) phenols and (9) peroxides. The Groups I, II and III referred to in (A) above are Groups I, II and III of the Periodic Table.

The compounds which are capable of being employed as the (A) catalyst components, with the exception of the compounds defined in (6), may be described as hydrides of metals of Groups II and III of the Periodic Table, derivatives of such hydrides or complexes of such hydrides. When referring to the above hydrides, derivatives of such hydrides and complexes of such hydrides, a special nomenclature can be employed. For example when the metal selected from Groups II and III of the Periodic Table is aluminum, the hydride, derivatives of the hydride and complexes of the hydride are referred to as alanes. In analogy, when the metal selected from Groups II and II is boron, the hydride and its derivatives and complexes are referred to as boranes. When gallium is the metal selected, the hydride and its derivatives and complexes are referred to as gallanes and when magnesium is the metal selected, the hydride and its derivatives and complexes are referred to as magnanes. Thus, a compound such as $H_2AlCl \cdot N(CH_3)_3$ is known as trimethylamine chloroalane. It may, of course, also be called trimethylamine chloroaluminum hydride and both names are equally descriptive and valid. Since $AlH_3$ is known to actually be a polymeric species and many of its derivatives may be polymeric also, the definition above is intended to include polymeric species as well. Polymeric species of such metal hydrides also may be readily formed when one of the substituents on the aluminum is polyvalent.

Certain of the compounds which can be employed as the (A) catalyst component of the present invention can be represented by the three formulae as follows:

Formula 1
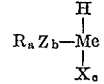

wherein Me represents a metal of Groups II or III of the Periodic Table; H is hydrogen; X is selected from hydrogen or halogen and Z is selected from hydrogen, halogen, oxygen or nitrogen; R represents a monovalent hydrocarbon radical such as alkyl, alkenyl, aryl, aralkyl, alkaryl and cycloalkyl containing from 1 to about 20 carbon atoms; $a$, $b$ and $c$ are integers; $a$ is one unit less than the absolute value of the valence of Z and may be 0, 1 or 2; $b$ is 0 or 1 as is $c$, while the sum of $b$ plus $c$ is one unit less than the valence of Me. It is understood, of course, that when $b$ is zero, there is no Me to R bond.

Formula 2 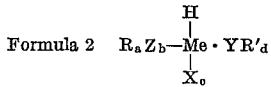

which represents complexes of the compounds of Formula 1. In Formula 2, Y represents oxygen, nitrogen, sulfur or phosphorus; R' represents hydrogen or a monovalent hydrocarbon radical such as alkyl, alkenyl, aryl, aralkyl, alkaryl and cycloalkyl containing from 1 to about 20 carbon atoms; and $d$ is an integer equal to the valence of Y. Where there are more than one R' groups, they need not be the same. The remainder of the symbols are as in Formula 1.

Formula 3 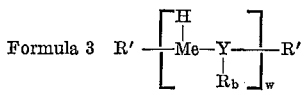

where the compound is polymeric in nature; $w$ represents the number of monomer repeat units in the polymer and all the other symbols are the same as in Formula 2 above. The subscript $w$ may vary over a wide range but it has a preferred range of from about 4 to about 50. It is to be noted that Me in Formula 3 must represent only a Group III metal and not a Group II metal.

The metals from Group II or III of the Periodic Table are preferably chosen from aluminum, magnesium, zinc or cadmium. Of these, aluminum is the most preferred.

The (A) catalyst component as illustrated by the symbolic Formula 1 above can be represented by the following chemical compounds. The compounds listed below are based on aluminum as the representative metal selected from either Group II or Group III and are properly called alane compounds. The representative compounds, although not exhaustive of their class, are as follows:

dimethylamino aluminum hydride or dimethylamino alane—$(CH_3)_2NAlH_2$
diisobutylamino aluminum hydride—$(iC_4H_9)_2NAlH_2$
diphenylamino aluminum hydride—$(C_6H_5)_2NAlH_2$
dimethylamino bromoaluminum hydride or dimethylamino bromoalane—$(CH_3)_2NAlHBr$
diethylamino chloroaluminum hydride—$(C_2H_5)_2NAlHCl$
methyl ethylamino iodoaluminum hydride—

$(CH_3)(C_2H_5)NAlHI$ ethoxy bromoaluminum hydride—$C_2H_5OAlHBr$

The (A) catalyst component as illustrated by the Formula 2 is an organic addition complex formed by a central metal hydride of Groups II and III metals complexed with various organic ligands. Representatives of such compounds include:

trimethylamine alane—$AlH_3 \cdot N(CH_3)_3$
triethylamine chloroalane or triethylamine chloroaluminum hydride complex—$AlH_2Cl \cdot N(C_2H_5)_3$
trimethylamine chloroalane—$AlH_2Cl \cdot N(CH_3)_3$
trimethylamine dichloroalane—$AlHCl_2 \cdot N(CH_3)_3$
trimethylamine chlorozinc hydride complex or trimethylamine chlorozincane—$ZnHCl \cdot N(CH_3)_3$
diethyl ether alane—$AlH_3 \cdot O(C_2H_5)_2$
diethyl ether dichloroalane—$AlHCl_2 \cdot O(C_2H_5)_2$
diethyl ether diiodoalane—$AlHI_2 \cdot O(C_2H_5)_2$
diethyl sulfide alane—$AlH_3 \cdot S(C_2H_5)_2$
triphenyl phosphine alane—$AlH_3 \cdot P(C_6H_5)_3$ and the like.

Examples of the types of organic molecules capable of forming addition complexes or ligand groups with metals of Groups II or III of the Periodic Table include ethers, cyclic ethers, tertiary amines and the like.

Also, polymers of the above aluminum amine hydrides can be formed. A representative example which is by no means exclusive of all the polymers which can be formed is poly(n-butyliminoalane) represented by the structural formula:

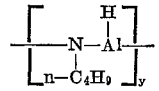

where the structure, within brackets, represents the basic monomer unit and $y$ represents the number of monomer repeat units in the polymer. For optimum service as a catalyst component, the polymeric alane derivatives should be within a molecular weight range which will permit the polymer to be readily dissolved in a suitable organic solvent. More will be said below of the solvents suitable for use in solution polymerization.

Another group of compounds capable of being employed as the (A) catalyst component is defined in (6) as being organometallic compounds wherein the metals are selected from Groups I, II and III of the Periodic Table and are organo-compounds of such metals as lithium, sodium, potassium, rubidium, cesium, magnesium, calcium, strontium, beryllium, barium, zinc, cadmium, aluminum, gallium and indium. The term "organometallic" as used here refers to compounds wherein at least one monovalent hydrocarbon radical such as alkyl, alkenyl, cycloalkyl, aryl, aralkyl and alkaryl is attached directly to metals of Groups I, II and III of the Periodic Table. All of the above compounds may be used in the practice of this invention.

When considering the organometallic compounds containing metals from Groups I, II and III, it is preferred for this invention to use organoaluminum compounds, organomagnesium compounds, organozinc compounds and organolithium compounds.

By the term "organoaluminum compound" is meant any organoaluminum compound responding to the formula:

in which $R_1$ is selected from a group consisting of hydrogen, fluorine, and a monovalent hydrocarbon radical such as alkyl, alkenyl, aryl, aralkyl, alkaryl, cycloalkyl and alkoxy containing from about 1 to about 20 carbon atoms and $R_2$ and $R_3$ are monovalent hydrocarbon radicals selected from a group consisting of alkyls, alkenyls, aryls, aralkyls, alkaryls and cycloalkyls containing from 1 to about 20 carbon atoms. Representative of the compounds responding to the formula set forth above are: diethylaluminum fluoride, di-n-propylaluminum fluoride, di-n-butylaluminum fluoride, diisobutylaluminum fluoride, di-hexylaluminum fluoride, dioctylaluminum fluoride and diphenylaluminum fluoride. Also included are diethylaluminum hydride, di-n-propylaluminum hydride, di-n-butylaluminum hydride, diisobutylaluminum hydride, diphenyl aluminum hydride, di-p-tolylaluminum hydride, dibenzylaluminum hydride, phenyl ethylaluminum hydride, phenyl n-propylaluminum hydride, p-tolylethylaluminum hydride, p-tolyl n-propylaluminum hydride, p-tolyl isopropylaluminum hydride, benzyl ethylaluminum hydride, and other organoaluminum hydrides. Also included are diethylaluminum ethoxide and dipropylaluminum ethoxide. Also included are trimethylaluminum, thiethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

By the term "organomagnesium compounds" is meant first, any organomagnesium complex responding to the formula $R_aMgX_b$ where R is a monovalent hydrocarbon radical such as alkyl, alkenyl, aryl, alkaryl, aralkyl and cycloalkyl containing from 1 to about 20 carbon atoms; X is a halogen, and $a$ and $b$ are mole fractions whose sum equals 2 while the ratio of $a/b$ is greater than 2 but is not infinite. Representative among the compounds responding to the formula set forth above are ethylmagnesium chloride complex, cyclohexylmagnesium bromide complex and phenylmagnesium chloride complex. Such compounds are usually prepared in the absence of ether.

Also, "organomagnesium compounds" means any organomagnesium compound or any organomagnesium halide of the Grignard type corresponding to the formulas $R_2Mg$ or RMgY where R may be alkyl, alkenyl, aryl, aralkyl or alkaryl and Y is fluorine, or R'R''Mg where R' may be alkyl, alkenyl, aryl or alkaryl and R'' may be either alkyl, alkenyl, aryl, aralkyl or alkaryl. Representative among the compounds responding to these formulae are diethylmagnesium, dipropylmagnesium, ethylmagnesium fluoride and phenylmagnesium fluoride.

By the term "organozinc compound" is meant by organozinc compound responding to the formula $R_2Zn$ where R is a monovalent hydrocarbon radical such as alkyl, alkenyl, aryl, aralkyl, alkaryl and cycloalkyl containing from about 1 to about 20 carbon atoms. Representative among such compounds are diethylzinc, dibutylzinc or diphenylzinc.

By the term "organolithium compounds" is meant any organolithium compound responding to the formula R-Li, where R is an alkyl, alkaryl, aralkyl or aryl group. Representative among the compounds responding to the formula set forth above are ethyllithium, propyllithium, n-, sec- or t-butyllithium, hexyllithium, 1-phenyl-n-hexyl-lithium, phenyllithium and the like. Also, the organolithium aluminum compounds may be used. These compounds respond to the formula R'R''$_3$LiAl where R' and R'' may be alkyl, alkaryl or aralkyl groups and R' and R'' may or may not be the same group. Representative of these compounds are n-butyltriisobutyllithium aluminum, tetrabutyllithium aluminum, butyltriethyllithium aluminum, tetraisobutyllithium aluminum and tetraethyllithium aluminum.

Representative of other organometallic compounds with metals selected from Groups I, II and III of the Periodic System are compounds containing at least one of the metals, sodium, potassium, calcium, beryllium, cadmium and mercury combined with at least one organic radical selected from the group consisting of alkyls, alkaryls, aralkyls, and aryls.

The (B) catalyst component is selected from a class consisting of (1) a nickel salt of a carboxylic acid, (2) an organic complex compound of nickel, (3) nickel tetracarbonyl and (4) pi-bonded organonickel compounds. These compounds can be compounds of the said metal with a mono- or bi-dentate organic ligand containing up to 20 carbon atoms. "Ligand" is defined as an ion or molecule bound to and considered bonded to a metal atom or ion. Mono-dentate means having one position through which covalent or coordinate bonds with the metal may be formed; bi-dentate means having two positions through which covalent or coordinate bonds with the metal may be formed. These compounds can also be compounds wherein the bonding between the nickel and the organic group is not of the classical covalent or coordinate type as described above, but rather one based on vacant pi orbitals arising from double bonded structures in the organic moiety.

Representative examples of the nickel salts of carboxylic acids and organic complex compounds of nickel are nickel benzoate, nickel acetate, nickel naphthenate, bis-(alphafuryl) dioxime nickel, nickel octanoate, nickel palmitate, nickel stearate, nickel acetylacetonate, bis(salicylaldehyde) ethylene diimine nickel and nickel salicyl- aldehyde. Representative examples of the pi-bonded organonickel compounds are bis($\pi$-allyl)nickel, bis($\pi$-methallyl)nickel, bis($\pi$ - crotyl)nickel, bis($\pi$ - cyclooctenyl)nickel, bis($\pi$-cyclopentenyl)nickel and the like.

The (C) catalyst component is an organic fluorochemical compound. The term "fluorochemical," as employed in this application, is defined as an organic compound which contains one or more fluorine atoms and which also contains a functional group in the organic moiety. Thus, the (C) catalyst component is a fluorochemical selected from a group consisting of fluorine containing (1) carboxylic acids, (2) acid anhydrides, (3) alcohols, (4) aldehydes, (5) esters, (6) epoxides, (7) ketones, (8) phenols and (9) peroxides.

Representative examples of fluorochemicals of the above group of compounds include (1) trifluoroacetic acid, pentafluoropropionic acid, perfluorohexanoic acid, pentafluorobenzoic acid, pentafluorophenoxyacetic acid and the like; (2) trifluoroacetic anhydride, pentafluoroproprionic anhydride, perfluoroglutaric anhydride and the like; (3) 2,2,2 - trifluoroethanol, pentafluoropropanol, 1H,1H,5H-octafluoro-1-pentanol, 1H,1H,7H - dodecafluoro-1-heptanol, pentafluorobenzyl alcohol, 1,1,1-trifluoropropanol-2, 3,3,4,4,4-pentafluorobutanol-2, hexafluoroisopropanol, 1-(pentafluorophenyl)ethanol, 2-(pentafluorophenyl)ethanol, perfluoroisobutyl alcohol, hexafluoro-2-phenylisopropanol, 2-trifluoromethylpropanol-2, 2-amino-hexafluoroisopropanol and the like; (4) trifluoroacetaldehyde hydrate, pentafluoroproprionaldehyde, pentafluorobenzaldehyde, perfluorooctanaldehyde, metafluorobenzaldehyde and the like; (5) trifluoroethyltrifluoroacetate, n-butyl pentafluoroproprionate, n-propyl perfluorooctanoate, ethyl difluoroacetate, ethyl perfluorosuccinate, phenyl trifluoroacetate and the like; (6) hexafluoropropylene epoxide, 3,3,3-trifluoro-1,2-epoxypropane and the like; (7) hexafluoroacetone, trifluoroacetone, pentafluoroethyl methyl ketone, hexafluoroacetylacetone, pentafluoroacetone, tetrafluoroacetone, benzoyltrifluoroacetone and the like; (8) pentafluorophenol, 2,3,5,6-tetrafluorophenol, para-fluorophenol and the like and (9) bis-trifluoromethyl peroxide, bis-pentafluoroethyl peroxide and the like. From the above group of compounds the secondary perfluoroalcohols, the perfluoroketones and the perfluorophenols are the most preferred fluorochemicals. By the term "perfluoro" is meant that all of the hydrogen atoms attached to non-functional group carbon atoms have been replaced with fluorine atoms.

The three component catalyst system of this invention has shown polymerization activity over a wide range of catalyst concentrations and catalyst ratios. Apparently, the three catalyst components interact to form the active catalyst. As a result, the optimum concentration for any one catalyst component is dependent upon the concentration of each of the other catalyst components. Although polymerization will occur over a wide range of catalyst concentrations and ratios, polymers having the most desirable properties are obtained over a narrower range. It has been found that polymerization will occur when the mole ratio of the (A) component of the catalyst system to (B) catalyst component ranges from about 0.3/1 to about 500/1, and when the mole ratio of the (C) catalyst component to (B) catalyst component ranges from about 0.3/1 to about 500/1 and where the mole ratio of the (A) component of the catalyst system to the (C) component of the catalyst system ranges from about 0.02/1 to about 6/1.

The preferred (A)/(B) mole ratio ranges from about 0.5/1 to about 150/1; the preferred (C)/(B) mole ratio ranges from about 1/1 to about 300/1 and the preferred (A)/(C) mole ratio ranges from about 0.04/1 to about 4/1.

The three catalyst components may be charged to the polymerization system as separate catalyst components in either a stepwise or a simultaneous manner, sometimes called "in situ." The catalyst may also be "preformed"

outside the polymerization system whereby all the catalyst components are mixed in the absence of the butadiene, either with or without an inert diluent and the resulting complete blend then added to the polymerization system.

The catalyst may also be "preformed" outside the polymerization system whereby all the catalyst components are mixed in the presence of small amounts of butadiene. The amount of the butadiene present can vary over a wide range but must be a catalytic amount. For good results the molar ratio of butadiene to the (B) catalyst component can range from about 0.5/1 to about 2000/1. A preferred mole ratio of butadiene to the (B) catalyst component ranges from about 8/1 to about 500/1.

The concentration of the total catalyst system employed depends on a number of factors such as purity of the system, polymerization rate desired, temperature and other factors, therefore, specific concentrations cannot be set forth except to say that catalytic amounts are used. Some specific concentrations and ratios which produce polymers having desirable properties will be illustrated in the examples given herein to explain the teachings of this invention.

In general, the polymerizations of this invention are carried out in any inert solvent, and thus, are solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, cycloaliphatic hydrocarbons and ethers, representative of which are pentane, hexane, heptane, toluene, benzene, cyclohexane, diisopropyl ether and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, such as butane or pentane, in which the polymer formed is insoluble. It should be understood, however, that it is not intended to exclude bulk polymerizations from the scope of this application. The polymerization may be continuous or batch type.

It is usually desirable to conduct the polymerizations of this invention employing air-free and moisture-free techniques.

The temperatures employed in the practice of this invention have not been found to be critical and may vary from a low temperature, such as −10° C. or below, up to high temperatures of 100° C. or higher. However, a more desirable temperature range is between about 0° C. and about 60° C. Ambient pressures are usually used but higher or lower pressures may be employed.

As employed in this specification, inherent viscosity, $[\eta]$, is defined as the natural logarithm of the relative viscosity at 30° C. divided by the polymer concentration for a 0.5 percent (wt./vol.) solution in toluene and is expressed in deciliters per gram (dl./g.).

The cis-1,4 structure of the polymers was determined by infrared analysis.

The practice of this invention is further illustrated by reference to the following examples which are intended to be representative rather than restrictive of the scope of the invention.

EXAMPLE I

A purified butadiene (BD) in benzene solution containing 100 grams (g.) of butadiene per liter of solution was charged into 4-ounce bottles. Nitrogen was flushed over the surface of the premix and the catalyst charged in situ in the amounts shown in the table below. The catalyst components and their order of in situ addition were (1) triethylaluminum (TEAL), (2) nickel octanoate (NiOct) and (3) hexafluoroisopropanol (HFIP). The sealed bottles were tumbled end-over-end for varying lengths of time in a water bath maintained at 50° C. The polymerizations were deactivated by the addition of a suitable stopping agent and an antioxidant.

TABLE I.—SOLVENT—BENZENE

| Exp. No. | Millimoles/100 g. BD | | | Time, hrs. | Weight percent yield | $[\eta]$ |
| --- | --- | --- | --- | --- | --- | --- |
| | TEAL | NiOct | HFIP | | | |
| 1 | 0.3 | 0.025 | 0.2 | 18 | 78 | 0.82 |
| 2 | 0.6 | 0.05 | 0.6 | 1 | 80 | 0.69 |
| 3 | 0.6 | 0.05 | 0.6 | 18 | 88 | [1] ND |
| 4 | 1.0 | 0.05 | 0.25 | 17 | 48 | 0.95 |
| 5 | 1.0 | 0.05 | 0.50 | 1 | 81 | 0.73 |
| 6 | 1.0 | 0.10 | 1.87 | 20 | 93 | 0.80 |
| 7 | 1.0 | 0.10 | 3.75 | 0.25 | 82 | 0.75 |
| 8 | 1.0 | 0.10 | 3.75 | 20 | 95 | 0.88 |

[1] Not determined.

The percent cis-1,4 content of the polymers produced in experiments numbered 1, 4 and 8 were found by infrared analysis to be 96.4, 96.9 and 94.5% respectively.

EXAMPLE II

A series of polymerizations was carried out similar to Example I with one exception. In this example all polymerizations were run at 5° C. rather than 50° C. as in Example I. All data are given in Table II below.

TABLE II.—SOLVENT—BENZENE

| Exp. No. | Millimoles/100 g. BD | | | Time, hrs. | Weight percent yield | $[\eta]$ |
| --- | --- | --- | --- | --- | --- | --- |
| | TEAL | NiOct | HFIP | | | |
| 1 | 0.6 | 0.025 | 0.45 | 29 | 83 | 1.46 |
| 2 | 0.6 | 0.025 | 0.60 | 29 | [1] 84 | 1.44 |
| 3 | 0.6 | 0.05 | 0.60 | 29 | 95 | 1.53 |
| 4 | 0.6 | 0.05 | 0.60 | 18 | 91 | 1.37 |
| 5 | 1.0 | 0.05 | 0.50 | 18 | 92 | 1.38 |

[1] 94.8% cis-1,4 structure.

EXAMPLE III

A series of polymerizations was carried out similar to Example I except that hexafluoroacetone (HFA) was employed in place of hexafluoroisopropanol (HFIP). The polymerization reactions were carried out in benzene solvent at 50° C. for 21 hours. All data are given in Table III below.

TABLE III

| Exp. No. | Millimoles/100 g. BD | | | Weight percent yield | $[\eta]$ |
| --- | --- | --- | --- | --- | --- |
| | TEAL | NiOct | HFA | | |
| 1 | 0.6 | 0.05 | 0.90 | 77 | 0.66 |
| 2 | 0.6 | 0.05 | 1.50 | [1] 73 | 0.89 |
| 3 | 1.0 | 0.10 | 2.20 | 90 | 0.79 |

[1] 94.3% cis-1,4 structure.

EXAMPLE IV

A series of polymerizations was carried out similar to Example I except that hexafluoroacetone sesquihydrate (HFA·1.5 H₂O) was employed instead of HFIP. Experiments numbered 5 and 6 were carried out at 5° C. The remaining experiments were run at 50° C. The table below contains all pertinent data.

TABLE IV

| Exp. No. | Millimoles/100 g. BD | | | Time, hrs. | Weight percent yield | $[\eta]$ |
| --- | --- | --- | --- | --- | --- | --- |
| | TEAL | NiOct | HFA·1.5 H₂O | | | |
| 1 | 1.0 | 0.05 | 0.25 | 19 | 77 | 0.66 |
| 2 | 1.0 | 0.05 | 0.50 | 20 | 86 | 0.72 |
| 3 | 1.0 | 0.05 | 1.00 | 20 | 89 | 0.81 |
| 4 | 1.5 | 0.05 | 0.50 | 19 | 77 | 0.51 |
| 5 | 1.0 | 0.05 | 0.50 | 20 | [1] 85 | 1.32 |
| 6 | 1.5 | 0.10 | 0.50 | 20 | 91 | 1.13 |

[1] 94.7% cis-1,4 structures.

EXAMPLE V

A series of polymerizations was carried out similar to Example I except that pentafluorophenol (PFP) was employed in place of HFIP. Experiment numbers 5 and 6 were polymerized at 3° C. The remaining polymerizations were carried out at 50° C. Typical results obtained with pentafluorophenol are shown in Table V below. Column 5 gives the polymerization times in hours.

TABLE V.—SOLVENT—BENZENE

| Exp. No. | Millimoles/100 g. BD | | | Time, hrs. | Weight percent yield | $[\eta]$ |
|---|---|---|---|---|---|---|
| | TEAL | NiOct | PFP | | | |
| 1 | 0.7 | 0.05 | 0.75 | 0.5 | 63 | 0.54 |
| 2 | 0.7 | 0.05 | 0.50 | 2 | 67 | [1] ND |
| 3 | 0.7 | 0.05 | 0.50 | 20 | [2] 76 | 0.50 |
| 4 | 0.7 | 0.10 | 0.75 | 20 | 88 | ND |
| 5 | 0.7 | 0.05 | 0.75 | 46 | 88 | 0.83 |
| 6 | 0.7 | 0.05 | 0.50 | 18 | 79 | 0.80 |

[1] Not determined.
[2] 91% cis-1,4 structure.

EXAMPLE VI

A series of polymerizations was carried out at conditions similar to those utilized in Example I except that hexafluoroacetylacetone (HFAA) was employed in place of HFIP. Experiments Nos. 1 through 5 were conducted at 50° C. for 64 hours, while Nos. 6 and 7 were conducted at 5° C. for 138 hours. Representative results obtained while using hexafluoroacetylacetone are summarized in Table VI.

TABLE VI

| Exp. No. | Millimole/100 g. BD | | | Weight Percent yield | $[\eta]$ |
|---|---|---|---|---|---|
| | TEAL | NiOct | HFAA | | |
| 1 | 0.70 | 0.05 | 0.3 | 40 | [1] ND |
| 2 | .7 | .05 | .4 | 66 | [2] 1.5 |
| 3 | .7 | .05 | .5 | 48 | 1.4 |
| 4 | 1.0 | .05 | .6 | 60 | 1.3 |
| 5 | 1.0 | .10 | .6 | 72 | 1.3 |
| 6 | .75 | .05 | .4 | 28 | 2.6 |
| 7 | 1.0 | .10 | .6 | 25 | 1.7 |

[1] Not determined.
[2] 95.4% cis-1,4-structure.

EXAMPLE VII

A purified butadiene in hexane solution containing 100 grams of butadiene per liter of solution was charged to 4-ounce bottles. Nitrogen was flushed over the surface of this premix and the catalyst charged in situ in the amounts shown in the table below. The catalyst components employed and their order of addition were (1) triethylaluminum (TEAL), (2) nickel octanoate (NiOct) and (3) hexafluoroisopropanol (HFIP). In experiment number 5 triisobutylaluminum (TIBAL) was employed in the place of TEAL. The polymerization reactions were carried out at 50° C. for 19 hours.

TABLE VII

| Exp. No. | Millimoles/100 g. BD | | | Weight percent yield |
|---|---|---|---|---|
| | TEAL | NiOct | HFIP | |
| 1 | 0.3 | 0.025 | 0.40 | 75 |
| 2 | 0.3 | 0.025 | 0.80 | 79 |
| 3 | 0.3 | 0.05 | 0.20 | 56 |
| 4 | 0.6 | 0.05 | 1.88 | 84 |
| 5 | [1] 0.3 | 0.025 | 0.40 | 77 |

[1] Triisobutylaluminum (TIBAL).

The DSV for experiment number 3 was found to be 0.33 deciliters/gram (dl./g.). The percent cis-1,4 content for the polymers produced in experiments numbered 3 and 4 was found to be 93.4 and 89.0% respectively as determined by infrared analysis.

EXAMPLE VIII

A purified butadiene in benzene solution containing 100 grams of butadiene per liter of solution was charged into 4 ounce bottles. Nitrogen was flushed over the surface of this premix and the catalyst charged in the amounts shown in the table below. The catalyst components and the order of their addition were (1) triethylaluminum (TEAL), (2) nickel octanoate (NiOct) and (3) an organic fluorochemical compound selected from a group consisting of (A) trifluoroacetone, (B) 2-aminohexafluoroisopropanol, (C) trifluoroethanol, (D) pentafluoropropanol, (E) perfluoroheptanol, (F) allyltrifluoroacetate, (G) 1,1,1-trifluoroethyltrifluoroacetate and (H) p-fluorophenol. The polymerizations were carried out at 50° C. and for varying lengths of time. Table VIII gives all relevant data. Column 1 sets forth the experiment number, column 2 the organic fluorochemical compound given above, columns 3, 4 and 5 the amounts of each catalyst component employed, column 6 the polymerization time in hours, column 7 the weight percent yield, column 8 the inherent viscosity of the polymer and column 9 sets forth the cis-1,4 content of the polymer.

TABLE VIII

| Exp. No. | Fluorochemical | Millimole/100 g. BD | | | Polymerization time, hrs. | Weight percent yield | $[\eta]$ | Percent cis-1,4 content |
|---|---|---|---|---|---|---|---|---|
| | | TEAL | NiOct | Fluorochemical | | | | |
| 1 | Trifluoroacetone | 0.70 | 0.10 | 0.75 | 83 | 51 | 1.17 | 95 |
| 2 | 2-aminohexafluoroisopropanol | 0.75 | 0.05 | 0.75 | 18 | 25 | 0.89 | 93 |
| 3 | Trifluoroethanol | 0.75 | 0.05 | 5.00 | 17 | 45 | 0.41 | 91 |
| 4 | Pentafluoropropanol | 0.75 | 0.05 | 1.50 | 17 | 52 | 0.46 | 91 |
| 5 | Perfluoroheptanol | 1.00 | 0.05 | 6.00 | 17 | 69 | 0.49 | 91 |
| 6 | Allyltrifluoroacetate | 0.75 | 0.05 | 1.00 | 17 | 47 | 0.29 | 87 |
| 7 | 1,1,1-trifluoroethyltrifluoroacetate | 1.00 | 0.05 | 4.80 | 17 | 43 | 0.39 | 90 |
| 8 | p-Fluorophenol | 0.75 | 0.05 | 6.00 | 66 | 52 | 0.35 | 83 |

While certain representative embodiments and details have been shown for the purpose of illustrating the invention, it will be apparent to those skilled in the art that various changes and modifications may be made therein without departing from the spirit and scope of the invention.

What is claimed is:
1. A process for the polymerization of butadiene or butadiene in mixture with isoprene to form polymers containing a high portion of the butadiene units in the cis-1,4 configuration comprising contacting at least one diolefin in an inert solvent under polymerization conditions with a catalyst comprising
(A) at least one organometallic compound selected from the group consisting of organometallic compounds responding to the formulae

(1)        $AlR_1R_2R_3$ in which $R_1$ is selected from the group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, and arylalkyl;

(2)        $R_2Mg$ wherein R may be alkyl, aryl, arylalkyl or alkaryl;

(3)        $RMgY$ wherein R may be alkyl, aryl, arylalkyl, or alkaryl and Y is fluorine;

(4)        $R_2Zn$ wherein R may be alkyl, aryl, alkaryl or arylalkyl; and (5)        $R-Li$ wherein R is an alkyl, alkaryl, arylalkyl or aryl; and
(B) at least one organonickel compound selected from the group consisting of
   (1) nickel salts of carboxylic acids,
   (2) organic complex compounds of nickel,
   (3) nickel tetracarbonyl, and
   (4) pi bonded organonickel compounds, and (C) at least one perfluoro organic compound selected from a group consisting of perfluoro
  (1) carboxylic acids,
  (2) acid anhydrides,
  (3) alcohols,
  (4) aldehydes,
  (5) esters,
  (6) epoxides,
  (7) ketones,
  (8) phenols and
  (9) peroxides wherein the mole ratio of $(A)/(B)$ ranges from about 0.5/1 to about 150/1, the mole ratio of $(C)/(B)$ ranges from about 1/1 to about 300/1 and the mole ratio of $(A)/(C)$ ranges from about 0.04/1 to about 4/1.

2. A process according to claim 1 in which the organometallic compound is an organoaluminum compound.

3. A process according to claim 2 in which the organoaluminum compound is a trialkylaluminum.

4. A process according to claim 1 in which the (B) catalyst component is a nickel salt of a carboxylic acid or an organic complex compound of nickel.

5. A process according to claim 1 in which the diolefin is 1,3-butadiene.

6. A process according to claim 1 in which the polymerization is conducted as a solution polymerization in an inert solvent.

7. A catalyst composition comprising (1) at least one organoaluminum compound, (2) a nickel salt of a carboxylic acid or organic complex compound of nickel and (3) a secondary perfluoroalcohol, perfluoroketone or a perfluorophenol wherein the mole ratio of $(A)/(B)$ ranges from about 0.5/1 to about 150/1, the mole ratio of $(C)/(B)$ ranges from about 1/1 to about 300/1 and the mole ratio of $(A)/(C)$ ranges from about 0.04/1 to about 4/1.

8. A catalyst composition according to claim 7 in which the secondary alcohol is hexafluoroisopropanol, the perfluoroketone is hexafluoroacetone or hexafluoroacetone sesquihydrate and the perfluorophenol is pentafluorophenol.

9. A process for the polymerization of butadiene or butadiene in mixture with isoprene to form polymers containing a high portion of the butadiene units in the cis-1,4 configuration comprising contacting at least one diolefin in an inert solvent under polymerization conditions with a catalyst comprising (A) at least one organometallic compound selected from the group consisting of organometallic compounds responding to the formulae (1) $RlR_1R_2R_3$ 

in which $R_1$ is selected from the group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, and arylalkyl;

(2) $R_2Mg$ 

wherein R may be alkyl, aryl, arylalkyl or alkaryl;

(3) $RMgY$ 

wherein R may be alkyl, aryl, arylalkyl, or alkaryl and Y is fluorine;

(4) $R_2Zn$ 

wherein R may be alkyl, aryl, alkaryl or arylalkyl; and (5) $R\text{-}Li$ 

wherein R is an alkyl, alkaryl, arylalkyl or aryl; and (B) at least one organonickel compound selected from the group consisting of
  (1) nickel salts of carboxylic acids,
  (2) organic complex compounds of nickel,
  (3) nickel tetracarbonyl, and
  (4) pi bonded organonickel compounds, and (C) at least one perfluoro organic compound selected from a group consisting of
  (1) secondary perfluoroalcohols,
  (2) perfluoroketones, and
  (3) perfluorophenols wherein the mole ratio of $(A)/(B)$ ranges from about 0.5/1 to about 150/1, the mole ratio of $(C)/(B)$ ranges from about 1/1 to about 300/1 and the mole ratio of $(A)/(C)$ ranges from about 0.04/1 to about 4/1.

10. A process according to claim 9 in which the secondary alcohol is hexafluoroisopropanol, the perfluoroacetone is hexafluoroacetone or hexafluoroacetone sesquihydrate and the perfluorophenol is pentafluorophenol.

References Cited
UNITED STATES PATENTS

| | | | |
|---|---|---|---|
| 3,170,907 | 2/1965 | Ueda et al. | 260—94.3 |
| 3,247,175 | 4/1966 | Van Volkenburgh et al. | 260—94.3 |
| 3,262,887 | 7/1966 | Calfee | 252—429 |
| 3,284,431 | 11/1966 | Gippin | 260—94.3 |
| 3,438,958 | 4/1969 | Throckmorton | 260—94.3 |

JOSEPH L. SCHOFOR, Primary Examiner

R. A. GAITHER, Assistant Examiner

U.S. Cl. X.R.

252—429, 431; 260—94.3

PO-1050
(5/69)

UNITED STATES PATENT OFFICE
CERTIFICATE OF CORRECTION

Patent No. 3,577,395          Dated May 4, 1971

Inventor(s) Morford C. Throckmorton and Joginder Lal

It is certified that error appears in the above-identified patent and that said Letters Patent are hereby corrected as shown below:

Column 4, line 67, "thiethylaluminum" should be

-- triethylaluminum --.

Claim 9, formula (1) should be changed from:

"$R1R_1R_2R_3$"

to -- $AlR_1R_2R_3$ --

Signed and sealed this 2nd day of May 1972.

(SEAL)
Attest:

EDWARD M. FLETCHER, JR.
Attesting Officer

ROBERT GOTTSCHALK
Commissioner of Patents